United States Patent
Smith et al.

(10) Patent No.: US 7,538,670 B2
(45) Date of Patent: May 26, 2009

(54) METHOD FOR DETECTING OBJECTS SEPARATED FROM A GROUP

(75) Inventors: Randall B. Smith, Palo Alto, CA (US); Robert F. Tow, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 257 days.

(21) Appl. No.: 11/327,064

(22) Filed: Jan. 6, 2006

(65) Prior Publication Data

US 2007/0008120 A1    Jan. 11, 2007

Related U.S. Application Data

(60) Provisional application No. 60/692,302, filed on Jun. 20, 2005.

(51) Int. Cl.
*G08B 1/08* (2006.01)
(52) U.S. Cl. .............. 340/539.26; 340/539.32; 340/571; 340/572.1; 340/572.4
(58) Field of Classification Search ........... 340/603, 340/604, 606, 539.1–539.13, 539.26, 540, 340/539.32, 571, 572.1, 572.4
See application file for complete search history.

(56) References Cited

U.S. PATENT DOCUMENTS

| | | | | |
|---|---|---|---|---|
| 5,214,410 A * | 5/1993 | Verster | ........................ | 340/505 |
| 5,892,441 A * | 4/1999 | Woolley et al. | ......... | 340/539.26 |
| 6,097,301 A * | 8/2000 | Tuttle | ...................... | 340/693.9 |
| 6,714,133 B2 * | 3/2004 | Hum et al. | ............... | 340/573.4 |
| 6,961,000 B2 * | 11/2005 | Chung | ..................... | 340/572.1 |
| 7,061,380 B1 * | 6/2006 | Orlando et al. | .......... | 340/572.1 |
| 7,149,658 B2 * | 12/2006 | Kadaba | ..................... | 702/184 |
| 2004/0124977 A1 * | 7/2004 | Biffar | .................... | 340/539.13 |

* cited by examiner

*Primary Examiner*—Daniel Wu
*Assistant Examiner*—Son M Tang
(74) *Attorney, Agent, or Firm*—Osha • Liang LLP

(57) ABSTRACT

A method for monitoring a plurality of objects, involving configuring a sensor for a first object of the plurality of objects, wherein the sensor monitors an environment of the first object, attaching the sensor to the first object, associating each of the plurality of objects together using a pre-defined stimulus to obtain an associated set of objects, and communicating a notification message when a change in activity of the environment of the first object is detected by the sensor.

22 Claims, 3 Drawing Sheets

METHOD FOR DETECTING OBJECTS SEPARATED FROM A GROUP

CROSS-REFERENCE TO RELATED APPLICATIONS

This application claims benefit of U.S. Provisional Application Ser. No. 60/692,302 filed on Jun. 20, 2005, entitled "Method For Detecting Objects Separated From A Group" in the names of Randall B. Smith and Robert F. Tow.

BACKGROUND

Objects that are shipped, delivered, sent, or otherwise exchanged from one geographic location to another geographic location need to be protected from damage, theft, etc. Particularly, objects of high value or importance need to be protected from theft during the time that the high value objects travel from one geographic location to another. Objects may include packages, containers, documents, people (e.g., children on a field trip that may be separated from their group of classmates), food sacks being delivered in a disaster relief effort, or any other item that may be sent/delivered in shipments or groups. In many cases, protecting a shipment of objects is difficult as it is not always possible to watch over the shipment. A group of objects may be unattended, resting on an airport tarmac, or waiting on a loading dock for a truck, for example.

Conventionally, a method used to protect shipments of objects involves the use of an radio frequency identification (RFID) harness (or other external technology that is capable of reading/identifying each object with an RFID tag in the shipment) that is strapped, placed, or otherwise secured at a fixed location (e.g., a doorway, vehicle opening, warehouse entrance, etc.) through which the shipment passes. The RFID harness includes several antennas attached to the harness, and the antennas are constantly scanning the surrounding area of the harness to search for RFID tags attached to each object in the shipment. Accordingly, when a package is removed from the group of objects that make up the shipment, the RFID harness does not pick up the removed object's RFID tag, and an alert may be issued to indicate that all the objects of the shipment did not pass through the RFID harness.

Alternatively, another method used to protect expensive and smaller consumer items (e.g., razor blades, makeup, etc.) involves placing the items on a "smart shelf" in the store in which the items are sold. In this case, when a consumer picks up one item to purchase, the smart shelf does not alert the store personnel. However, if a consumer attempts to remove several items from the shelf (or the entire inventory), then the smart shelf alerts the store personnel that a theft may be in progress.

The more information that investigators have about the theft of objects, the more likely the thieves are eventually discovered. Information sought by investigators include determining exactly how the shipment evaded detection of RFID harnesses or smart shelves, when and/or where the object was separated from the shipment or removed from a shelf, etc.

SUMMARY

In general, in one aspect, the invention relates to a method for monitoring a plurality of objects, comprising configuring a sensor for a first object of the plurality of objects, wherein the sensor monitors an environment of the first object, attaching the sensor to the first object, associating each of the plurality of objects together using a pre-defined stimulus to obtain an associated set of objects, and communicating a notification message when a change in activity of the environment of the first object is detected by the sensor.

In general, in one aspect, the invention relates to a system, comprising a plurality of objects, wherein each of the plurality of objects are associated together using a pre-defined stimulus to obtain an associated set of objects, and a sensor associated with a first object of the plurality of objects, wherein the sensor monitors an environment of the first object, and wherein the sensor is configured to communicate a notification message when a change in activity of the environment of the first object is detected by the sensor.

Other aspects of the invention will be apparent from the following description and the appended claims.

DETAILED DESCRIPTION

Figure 1:
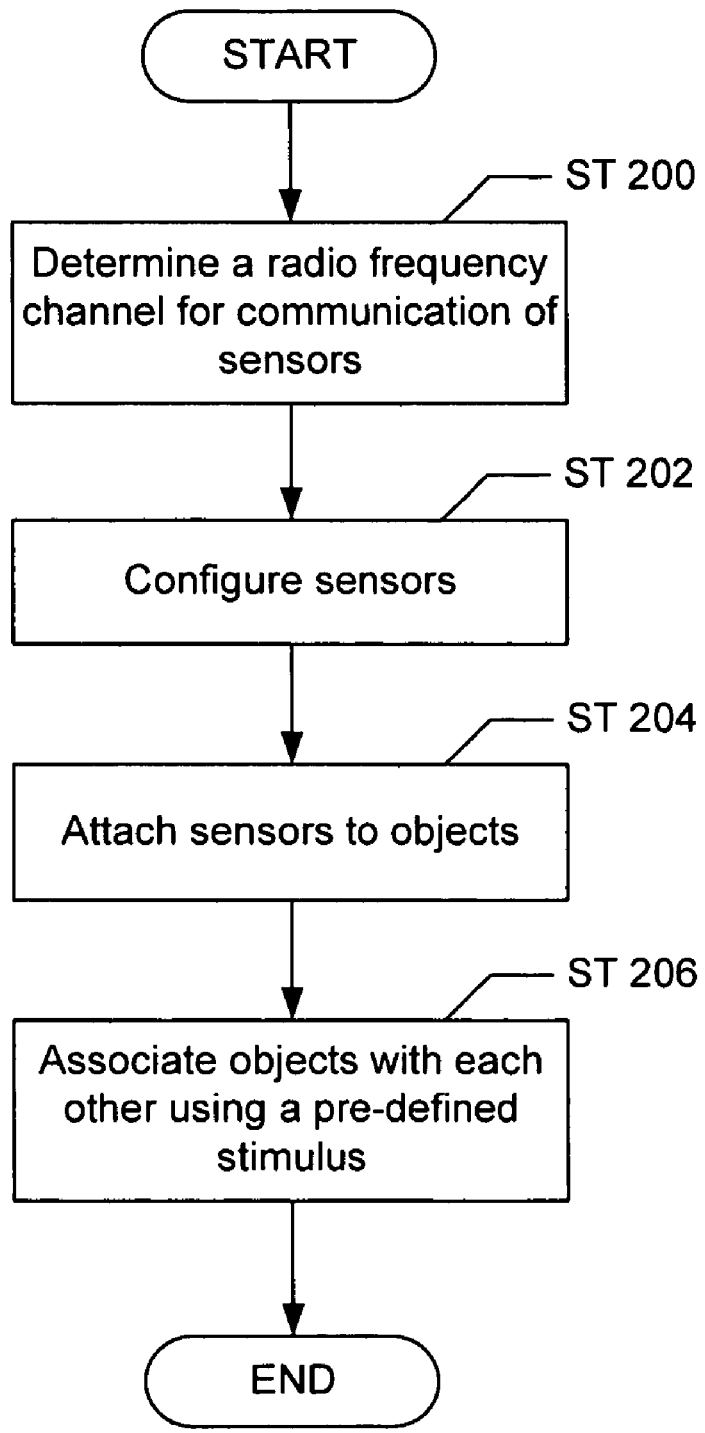
FIG. 1 shows a flow chart for setting up the sensors protecting a group of objects in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method for detecting the separation of an object from a designated group of objects. More specifically, embodiments of the invention relate to using wireless sensors attached to objects to detect the separation of one or more objects from a designed group of objects. Further, embodiments of the invention relate to detecting the separation of an object using sensors that monitor the environment associated with a group of objects and are capable of alerting an appropriate entity when an anomaly in the environment of one object of the group occurs.

In one embodiment of the invention, each object that is a member of a designated group of objects is associated with some type of wireless sensor (e.g., a 2-dimensional accelerometer, a 3-dimensional accelerometer, a temperature sensor, a light/sound detection sensor, or any other sensor with local computing power). Those skilled in the art will appreciate that the invention may also be implemented such that only the high value objects in a group are equipped with a wireless sensor while other less valuable objects may travel without a sensor.

In one embodiment of the invention, a group of objects may be a shipment of packages that is being sent/delivered from one geographic location to another, a group of people, a group of documents, or any other group of items that are moved from one place to another and are at risk of theft or abduction. Further, in one embodiment of the invention, the wireless sensors associated with each object are configured to monitor the local environment around the object with which each sensor is associated (i.e., the sensor monitors the local environment around the sensor's object). For example, wireless sensors associated with objects may monitor motion, sound, light, temperature, barometric pressure, magnetometer readings, radio strength, combinations of the aforementioned environment variables, etc.

In one embodiment of the invention, the wireless sensors may be further configured to periodically communicate notification messages reporting the status of the local environment associated with objects. If the notification messages communicated by a particular wireless sensor indicate anomalies in the local environment of the object, the other wireless sensors of the group are configured to report the anomalies, and communicate an alert to other wireless sensors in the group or a central entity configured to receive alerts and report anomalies that occur for objects in the group. In one embodiment of the invention, an anomaly may be any detection of a change in the activity of the local environment of one object that did not occur with other objects in the group. Said another way, each wireless sensor checks for changes in the local environment activity of the object associated with that wireless sensor against the others in the group to assure that its change is not anomalous. For example, during a shipment of objects, if a pallet is lifted or a truck is in motion, no wireless sensor is particularly alarmed at its various jiggles, jolts, or local environment changes because all other associated objects have the same changes. However, if changes in the activity of the local environment are detected for one object that others in the group do not experience, an object may suspect separation from the group and send out an alarm signal.

Similarly, as an object is carried away from the group with which the object is associated, the radio signal strength drops while amongst those in the group the signal remains constant and strong. Thus, in one embodiment of the invention, the other objects in the group may be alerted that one of the objects has faded away and is therefore separated from the group. In addition, simply the presence of an object may be used to detect the separation of an object from a group of objects. If an object fails to communicate/report as expected, the rest of the group can raise an alert. In one sense, the objects are acting like bees in a beehive where the worker bees are communicating vital information about the hive to each other. A further improvement may be realized by employing the equivalent of an "arousal level," as in bees; a bee hive disturbed by an intruder will raise the activity level of all the bees, by signals communicated between individual bees, resulting in increased mobility and aggression on the part of the bees. Similarly, objects as described in this invention may normally be in a power conservation mode, where they communicate with radios, sensors, and computing resources in timed intervals, while cycling through "sleep" modes. When a theft (or other disturbance) in progress is detected, a signal may be propagated between the devices in a group which results in objects changing to active mode. Active mode results in more resources being spent in active sensing, computing, and communication, to better sample, represent, store, and communicate the disturbance/abnormal event. As with the arousal of bees in a hive, this excitement would diffuse through the group, and decay over time in the absence of further abnormal stimulation or alert.

Moreover, a wireless sensor associated with an object is configured to store a history of local environment changes communicated from other wireless sensors associated with objects in the group. Thus, because a history of environment changes is stored, if a theft occurs, the entire history of environment changes may be examined to determine exact information associated with the theft (i.e., time, location, motions detected immediately surrounding the theft, etc.). Additional information may also be sensed during a theft. For example, if a package equipped with accelerometers is picked up by a thief and carried away, its movements and accelerations in three dimensions can be used to infer characteristics of the thief, such as the length of stride and rate of gate of the thief, the thief's height, detection of a limp, running, use of a car as transport, etc. Understanding the exact circumstances of separation (e.g., knowing the place and time of the theft) may aid greatly in recovery of the stolen item.

FIG. 1 shows a flow chart for setting up a group of objects to be monitored using wireless sensors in accordance with one embodiment of the invention. Initially, a radio frequency channel is determined for the wireless sensors to communicate with each other or to a central entity that manages the group of objects (Step 200). Subsequently, the wireless sensors are configured (Step 202). In one embodiment of the invention, configuring the wireless sensors may include setting the appropriate radio frequency channel, and starting the internal clock of the wireless sensors. In one embodiment of the invention, the internal clock of the wireless sensors is mapped to real time, so that the actual time that an object is separated from the group can be calculated using the internal clocks of the wireless sensors. More specifically, in one embodiment of the invention, the use of the clocking mechanism combined with Global Positioning System (GPS) tracking enables the exact time and location at which an object was separate from a group of objects.

For example, the particular signature in the sensor that may be implemented is the square of the magnitude of the acceleration vector because this signature is a scalar that is independent of the orientation of the object. This value may be sampled at intervals to form a time series, and the time series may be compared with that of another device by forming a convolution. The convolution function should show a large positive value near zero if the two signals represent similar accelerations. If no such large positive value is found, an alert can be raised. In one embodiment of the invention, if a large positive value near zero is not found in the convolution, the system may form a more careful analysis before concluding an alarm should be raised. For example, more comparisons might be performed with other object local environment histories in the group, etc.

At this stage, the wireless sensors are attached to the objects (or only the high value objects) (Step 204). Finally, the objects that are part of a group are associated with each other, such that each wireless sensor knows which other wireless sensors are part of the group. (Step 206). In one embodiment of the invention, the objects that are part of a group are associated such that each object has the same type of sensor attuned to detect the same local environment changes (i.e., barometric pressure, light, sound, etc.). As a result of this grouping, the each wireless sensor is able to communicate with other wireless sensors in the group should an anomaly occur. In one embodiment of the invention, objects may be associated with each other using a pre-defined stimulus that allows each wireless sensor to know the group to which they belong. For example, tapping each object that includes a wireless sensor once using a human hand or other tool may indicate that the objects tapped are part of a group of objects associated with each other. Alternatively, a group of objects may be associated by performing several serious of actions, such as scanning the objects with identical bar codes, pulsing the entire group of object with the same pulse that may only be recognized within a small, fixed distance (i.e., a distance to only include packages on a single pallet), etc.

Figure 2:
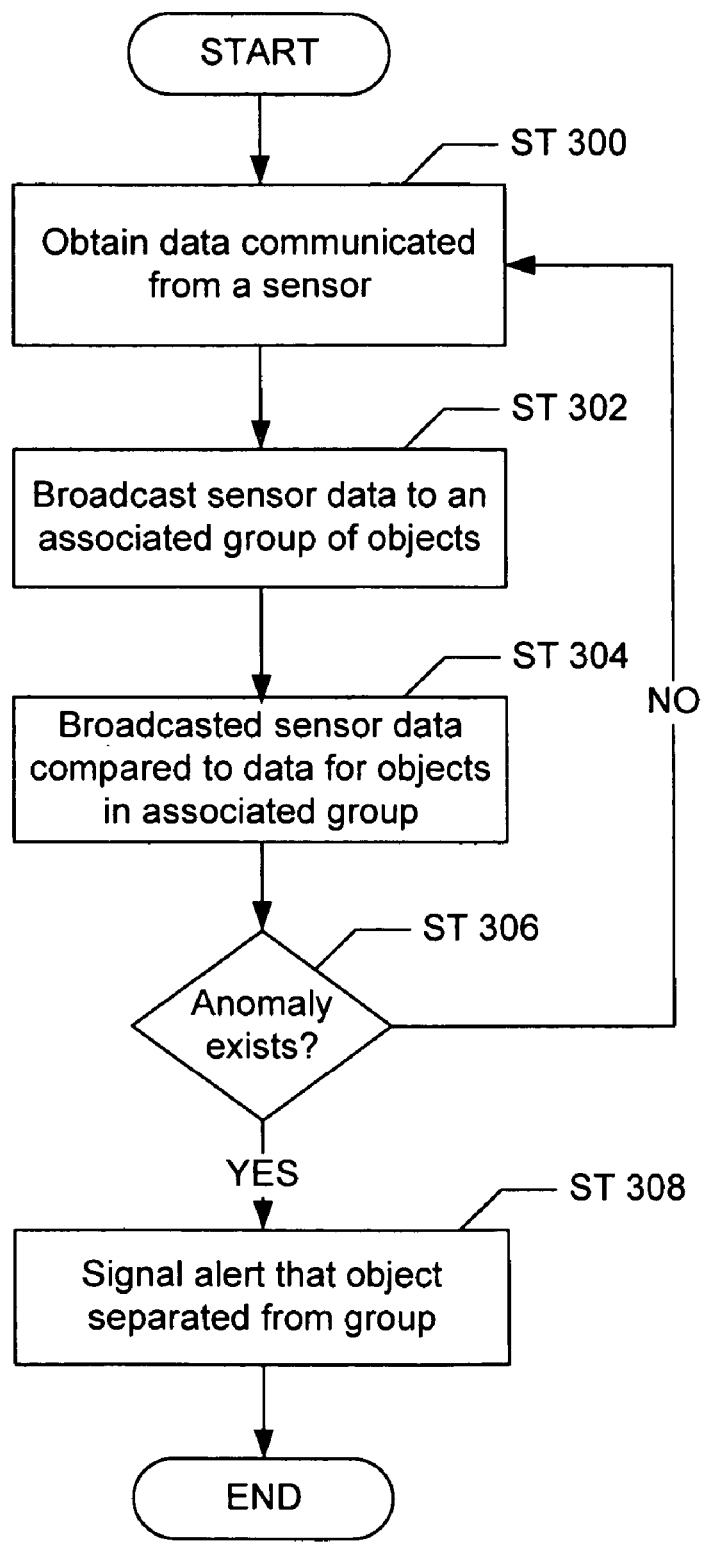
FIG. 2 shows a flow chart for protecting a group of objects in accordance with one embodiment of the invention.

FIG. 2 shows a flow chart for detecting the separation of one or more objects from a group of objects in accordance with one embodiment of the invention. As noted above, wireless sensors attached to objects associated with each other are configured to communicate the state of the location environment of objects. Specifically, the wireless sensors may periodically communicate a notification message with the state of the local environment of the objects with which the wireless sensors are associated to other wireless sensors in the group. Further, the amount of information communicated to other objects may vary significantly based on the type of object, the memory constraints of the sensor, and the security level needed.

Beginning with FIG. 2, initially, the wireless sensor data (i.e., local environment detections) of each object that is associated with the same group is obtained (Step 300). In one embodiment of the invention, wireless sensor data may be obtained from a notification message communicated from one or more wireless sensors. The timing of obtaining the wireless sensor data may vary depending on how the wireless sensors are being used and the types of objects (or value of the items associated with the objects) being tracked. For example, the timing may be tuned to obtain data as often as every second or as long as several hours.

Subsequently, in one embodiment of the invention, the wireless sensor data that was obtained in Step 300 is broadcast to some or all of the wireless sensors attached to objects that are associated with the same group (Step 302). The decision of which wireless sensors receive the sensor data may depend on the type of objects involved and the level of security desired. As noted above, a history of the wireless sensor data communicated from one object in a group of objects may be stored in other wireless sensors. Alternatively, in one embodiment of the invention, wireless sensors may periodically communicate the state of the environment for an object to a central entity responsible for communicating notification messages. In this case, the central entity may store the history of wireless sensor data associated with each object.

Each object subsequently compares the local environment state of other objects in the group to its own local environment state (Step 304). A determination is then made whether an anomaly exists (i.e., a change in the activity of the local environment of an object that did not occur in other objects of the group) in the local environment of an object that communicated via its wireless sensor (Step 306). If the other objects experience the same changes in local environment as the object, then Steps 300-308 may be repeated periodically (at a tunable rate) to ensure that each object is experiencing the same local environment changes that the other objects in the group are experiencing.

In contrast, if an anomaly exists, then an alert may be signaled that an object has separated from the group (Step 308). For example, the wireless sensor associated with the separated object may alert the others that an anomaly exists. Alternatively, the group may notice an object has separated and alert the other objects in the group.

Figure 3:
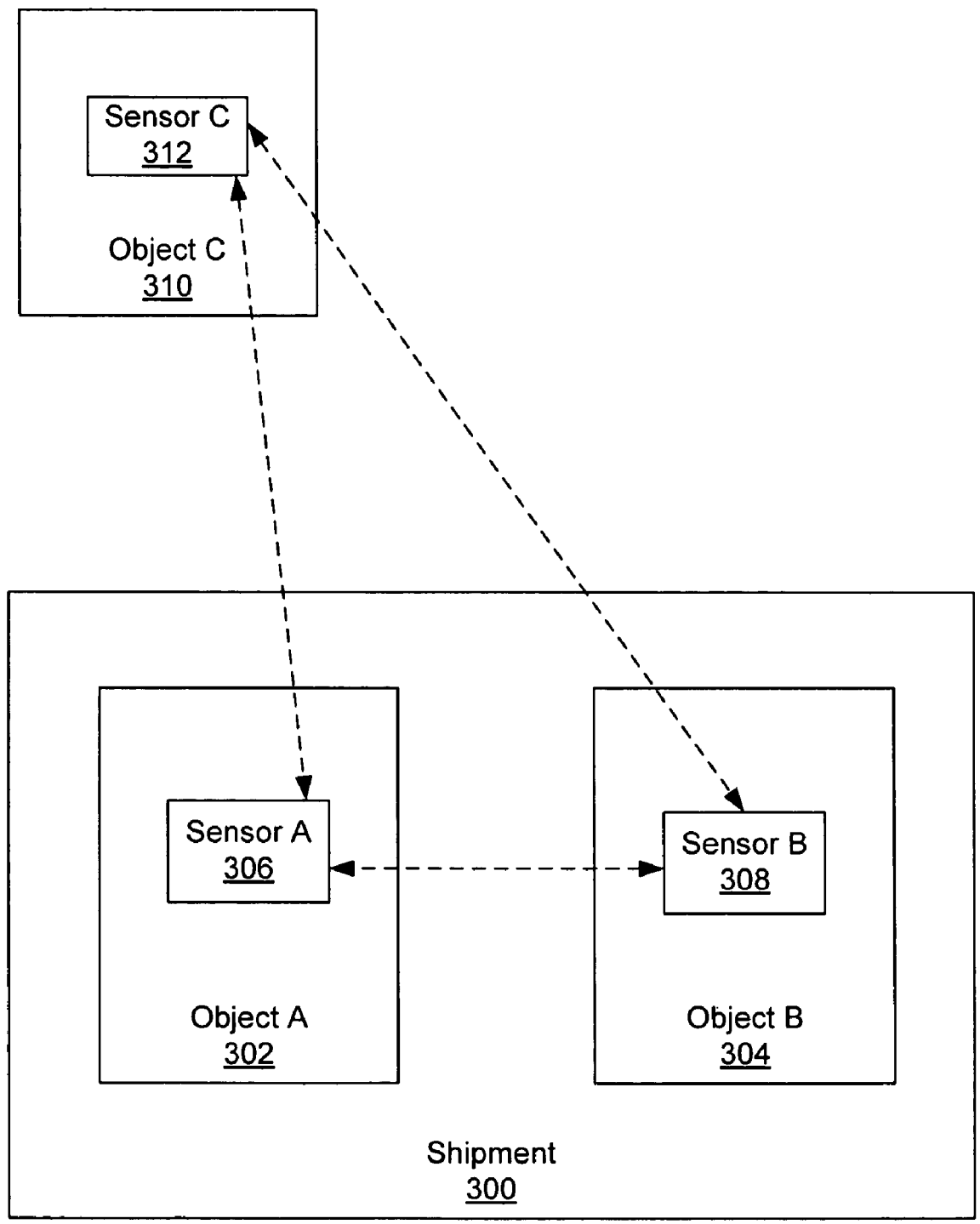
FIG. 3 shows a system in accordance with one embodiment of the invention.

FIG. 3 shows an example of objects in accordance with one embodiment of the invention. In FIG. 3, a shipment (300) of objects is shown with Object A (302) associated with Sensor A (306), and Object B (304), associated with Sensor B (308). Further, Object C (310), associated with Sensor C (312), is shown as being away from the shipment (e.g., object C (310) may have fallen off the shipment carrier, being carried away from the shipment, etc.). The dotted lines between each object sensor (306, 308, 312) represent notification messages that are periodically sent amongst the sensors to indicate the current environment status of each object. In FIG. 3, once Object C (310) realizes that the environmental changes being observed by Sensor C (312) are different from the environmental status of Object A (302) and Object B (304), Sensor C (312) sends out an alert to Object A (304) and Object B (304), making those objects aware that Object C is experiencing an anomaly in its environmental changes.

In one embodiment of the invention, an alert communicated from the separated object (i.e., Object C (310)) to the others in the group of objects may be an alarm signal (e.g., flashing a light or making a loud noise like a car horn or alarm), a cell phone call placed by the wireless sensor, reporting to some special "alarm center" (e.g., in the truck or in the palette that the group of objects is on at that time), etc. Alternatively, in one embodiment of the invention, a separated object may start "pinging" its environment until the object finds it is proximate to some friendly receiver who can relay an alert to an appropriate entity. Once Object C (310) communicates an alert to Object A (302) and Object B (304), using the methods described above, Sensor A (306) and Sensor B (308) can report that Object C (310) has fallen off the shipment carrier, been stolen, etc.

Those skilled in the art will appreciate that the invention may also be implemented such that wireless sensors remain silent (i.e., do not communicate the local state of the environment of an object) when the object is still, allowing the wireless sensors to conserve energy. In this case, the wireless sensors may not periodically communicate notification messages regarding the state of the local environment associated with objects, and only communicate a notification message when a change in the environment is detected. Even in this case, the method of FIG. 2 may be used to determine any anomalies and send an alert to other wireless sensors in a group of objects that an object has been separated from the group.

In one embodiment of the invention, to prevent false alarms, wireless sensors are configured to detect when the object attached to the wireless sensor is being handled by an authorized person. For example, an authorized person moving an object from the group of objects to the destination of the object may carry a wireless device capable of identifying itself to the wireless sensor on the object in a trusted manner (e.g., using a cryptographically provable communication). Thus, although the wireless sensor on the object may initially detect an anomaly in the local environment of the object being handled by an authorized person, the wireless device or indicator carried by the authorized person may quickly enable the wireless sensor on the object to detect that the object is being handled by an authorized person. Therefore, if in proximity to an authorized person, an object is capable of concluding that anomalous environment changes are not a sign of theft.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring a plurality of objects, comprising:

configuring a sensor for a first object of the plurality of objects, wherein the sensor monitors an environment of the first object;

attaching the sensor to the first object;

associating each of the plurality of objects together using a pre-defined stimulus to obtain an associated set of objects;

communicating a notification message when a change in activity of the environment of the first object is detected by the sensor;

receiving the notification message from the sensor by the associated set of objects, wherein each of the associated set of objects is attached to one of a plurality of sensors; and comparing the notification message received from the sensor of the first object to a change in the environment of the associated set of objects.

2. The method of claim 1, further comprising:

signaling an alert, from the sensor to the associated set of objects, when the change in activity of the first object is not shared by a remainder of the associated set of objects.

3. The method of claim 2, wherein the sensors corresponding to the associated set of objects are initially in a power conservation mode, and change to active mode when an alert signal is received.

4. The method of claim 2, wherein the alert is one selected from the group consisting of flashing a light, making a loud noise, and a cellular phone call reporting the alert to a central entity.

5. The method of claim 1, wherein the sensor is further configured to detect when the first object is handled by an authorized person, and wherein if the first object is being handled by the authorized person, a notification message is not communicated.

6. The method of claim 1, wherein the sensor is a wireless sensor selected from the group consisting of a 2-dimensional accelerometer, a 3-dimensional accelerometer, a temperature sensor, a light detection sensor, and a sound detection sensor.

7. The method of claim 1, wherein the pre-defined stimulus comprises one selected from the group consisting of tapping the plurality of objects a pre-determined number of times, scanning the plurality of objects with identical bar codes, and pulsing the plurality of objects with an electromagnetic pulse.

8. The method of claim 1, wherein configuring the sensor for the first object comprises determining a radio frequency channel used by the first object to communicate with the plurality of objects.

9. The method of claim 1, wherein the change in activity of the environment of the first object comprises at least one selected from the group consisting of a change in the motion of the first object, a change in the amount of light the first object is exposed to, a change in the temperature of the first object, a change in the temperature surrounding the first object, a change in the barometric pressure surrounding the first object, a change in the radio strength of the first object, and a change in the sound surrounding the first object.

10. The method of claim 1, wherein the plurality of objects are packages being shipped from one geographic location to another geographic location.

11. The method of claim 1, further comprising:

communicating the notification message periodically.

12. The method of claim 1, wherein the change in activity of the environment of the first object is used to infer characteristics of a person handling the first object.

13. A system, comprising:

a plurality of objects, wherein each of the plurality of objects are associated together using a pre-defined stimulus to obtain an associated set of objects; and a sensor associated with a first object of the plurality of objects, wherein the sensor monitors an environment of the first object, wherein the sensor is configured to communicate a notification message when a change in activity of the environment of the first object is detected by the sensor, wherein each of the associated set of objects are attached to one of a plurality of sensors, wherein the plurality of sensors are configured to receive the notification message from the sensor; and wherein the plurality of sensors are configured to compare the notification message received from the sensor of the first object to a change in the environment of the associated set of objects.

14. The system of claim 13, wherein the first object is configured to signal an alert to the associated set of objects, when the change in activity of the first object is not shared by a remainder of the associated set of objects.

15. The system of claim 14, wherein the sensors corresponding to the associated set of objects are initially in a power conservation mode, and change to active mode when an alert signal is received.

16. The system of claim 14, wherein the alert is one selected from the group consisting of flashing a light, making a loud noise, and a cellular phone call reporting the alert to a central entity.

17. The system of claim 13, wherein the sensor is further configured to detect when the first object is handled by an authorized person, and wherein if the first object is being handled by the authorized person, a notification message is not communicated.

18. The system of claim 13, wherein the sensor is a wireless sensor selected from the group consisting of a 2-dimensional accelerometer, a 3-dimensional accelerometer, a temperature sensor, a light detection sensor, and a sound detection sensor.

19. The system of claim 13, wherein the pre-defined stimulus comprises one selected from the group consisting of tapping the plurality of objects a pre-determined number of times, scanning the plurality of objects with identical bar codes, and pulsing the plurality of objects with an electromagnetic pulse.

20. The system of claim 13, wherein configuring the sensor for the first object comprises determining a radio frequency channel used by the first object to communicate with the plurality of objects.

21. The system of claim 13, wherein the change in activity of the environment of the first object comprises at least one selected from the group consisting of a change in the motion of the first object, a change in the amount of light the first object is exposed to, a change in the temperature of the first object, a change in the temperature surrounding the first object, a change in the barometric pressure surrounding the first object, a change in the radio strength of the first object, and a change in the sound surrounding the first object.

22. The system of claim 13, wherein the change in activity of the environment of the first object is used to infer characteristics of a person handling the first object.

* * * * *